Sept. 28, 1954  H. A. WATERS ET AL  2,690,355
SPRAYING DEVICE FOR ATTACHMENT TO TRACTORS
Filed Feb. 26, 1948  7 Sheets-Sheet 1

INVENTORS.
HAROLD A. WATERS
GLENN A. TANNER
HAROLD P. NORTH, JR.
BY [signature]
ATTY

INVENTORS.
HAROLD A. WATERS
GLENN A. TANNER
HAROLD D. NORTH, JR.

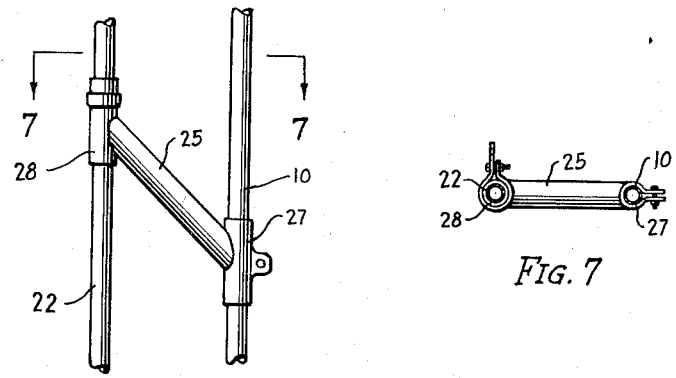
FIG. 6
FIG. 7
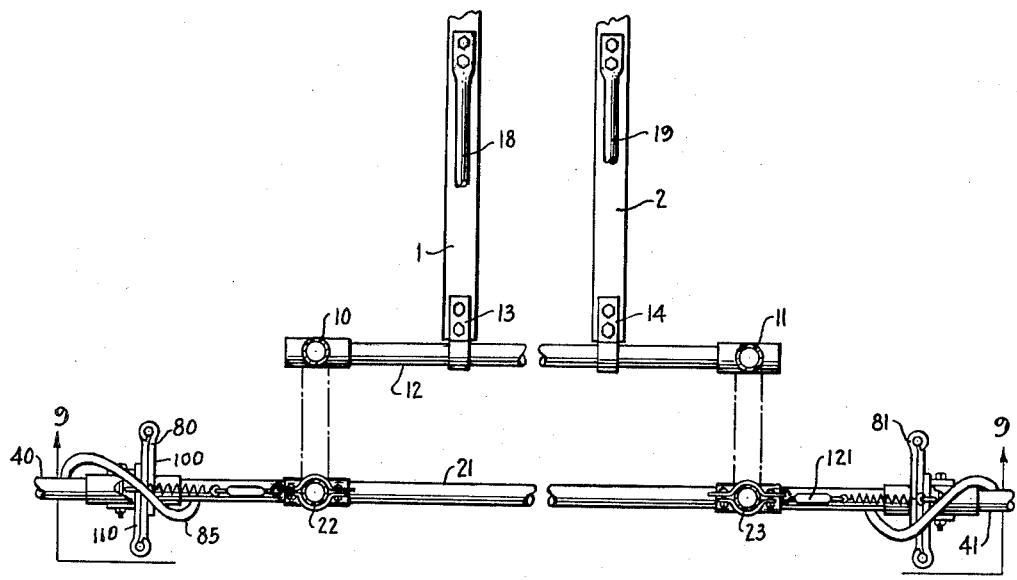
FIG. 8

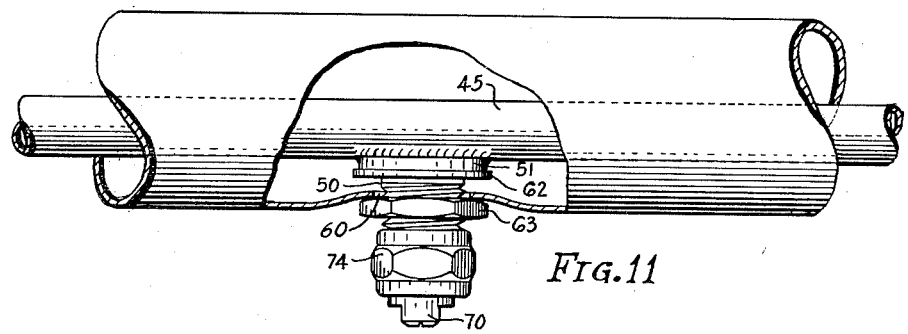
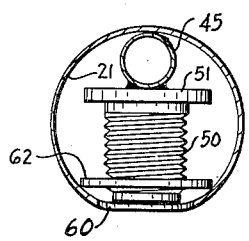
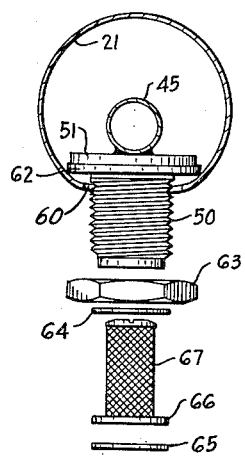
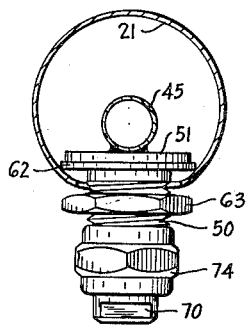

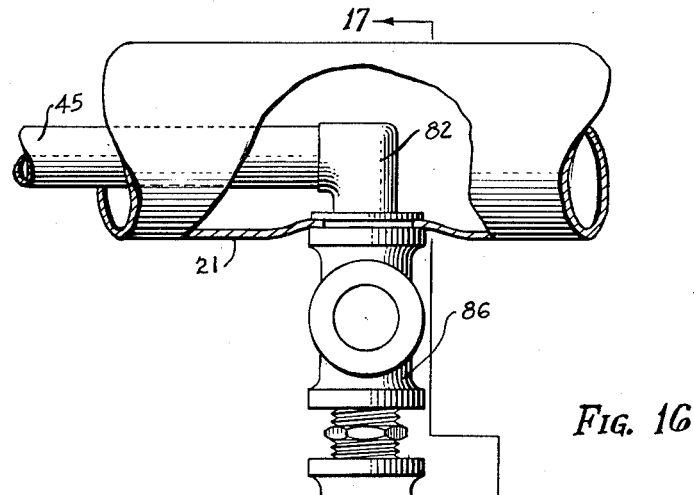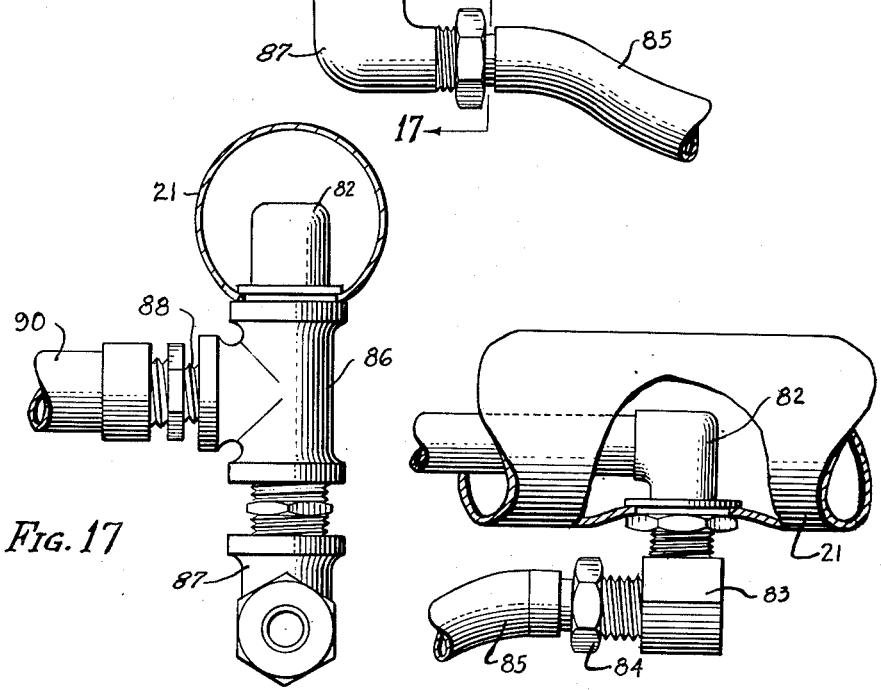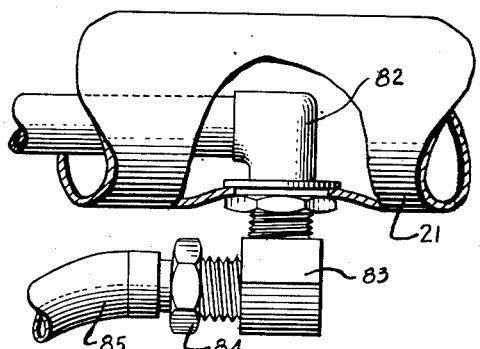

Patented Sept. 28, 1954

2,690,355

UNITED STATES PATENT OFFICE 2,690,355

SPRAYING DEVICE FOR ATTACHMENT TO TRACTORS

Harold A. Waters, Cleveland Heights, Glenn A. Tanner, North Olmsted, and Harold D. North, Jr., Shaker Heights, Ohio, assignors, by direct and mesne assignments, to The Engine Parts Manufacturing Company, Cleveland, Ohio, a corporation of Ohio Application February 26, 1948, Serial No. 11,226

8 Claims. (Cl. 299—41)

This invention relates to spraying devices, and particularly to those adapted to be carried by power propelled vehicles, such, for example, as farm tractors.

Its objects include so arranging such a spraying device that it may be simple in construction, easily mounted on the tractor or like vehicle, and effective in operation.

Specific objects include the spraying over a wide zone or swath with a uniform spray and at varying heights, and the provision of mechanism for adjusting the height from which the spray is delivered across the swath, and which mechanism is controlled for height adjustment from the driver's seat.

Other objects include delivering this spray from specially constructed pipe conveyors and nozzle carriers comprising intermediate and outer sections and which are capable of being folded to a width suitable for passing through gates, barn doors, and the like. That is, the outer sections may be swung outwardly and may be maintained extended and in alignment during spraying.

Further advantages and novel constructions result from so mounting the outer sections or extensions that they may be hinged to swing upwardly from the horizontal position, as well as being capable of being swung inwardly to a position in front of the tractor.

Other objects include the provision of an effective and unique connection for the passages or tubes for the spray nozzles, permitting the swinging and for the operation of unique and effective hinge mountings.

In connection with the hinge mountings, another object is to provide spring tension members normally maintaining the extended spraying position of the outer sections, and which are also adapted to hold the extended members in the inwardly folded position.

Other objects include the provision of simple and effective means for connecting the reservoir or tank supply means for the spraying liquid and a means for forcing the fluid to the spray nozzles at uniform spraying pressures.

Specific objects include the carrying of small tubular members connected with the individual spray nozzles within tubular supporting members which are light in weight and relatively rigid and durable in use.

Various other objects will become apparent from the following description which relates to the accompanying drawings illustrating preferred embodiments and arrangements included within the scope of our invention, the essential characteristics of which are summarized in the appended claims.

In the drawings, Fig. 1 is a front elevation of our spraying device showing it mounted upon a farm tractor, illustrated in outline only.

Fig. 6 is a detail of one of the diagonal connections between the upright members on the tractor and the adjustable portion of the spray carrying frame;

Fig. 7 is a sectional detail taken on the line 7—7 of Fig. 6;

Fig. 8 is a sectional plan of the lower portion of the carrier frame and nozzle carrying members;

Fig. 11 is a detail elevation partly in section showing the mounting of a spray nozzle and its connection with a tubular supply line;

Fig. 12 is a detail in the nature of a section through the carrier tube showing the method of assembling the spray supply tube and nozzle therein;

Fig. 13 is a composite view of the nozzle parts and showing the carrying tube and spray conveyor tube in section;

Fig. 14 is an axial section through the spray nozzle showing the carrier member and conveyor tube in section;

Fig. 15 shows these parts just as the assembly is being completed;

Fig. 16 is a detail elevation partly in section showing the spray tube connection with one of the flexible hose members;

Fig. 17 is a sectional detail taken on a plane indicated by the lines 17—17 of Fig. 16;

Fig. 18 is a detail similar to Fig. 16, showing the connection of the flexible hose member to the end of the spray fluid carrying tube in one of the extension members;

Figure 1:
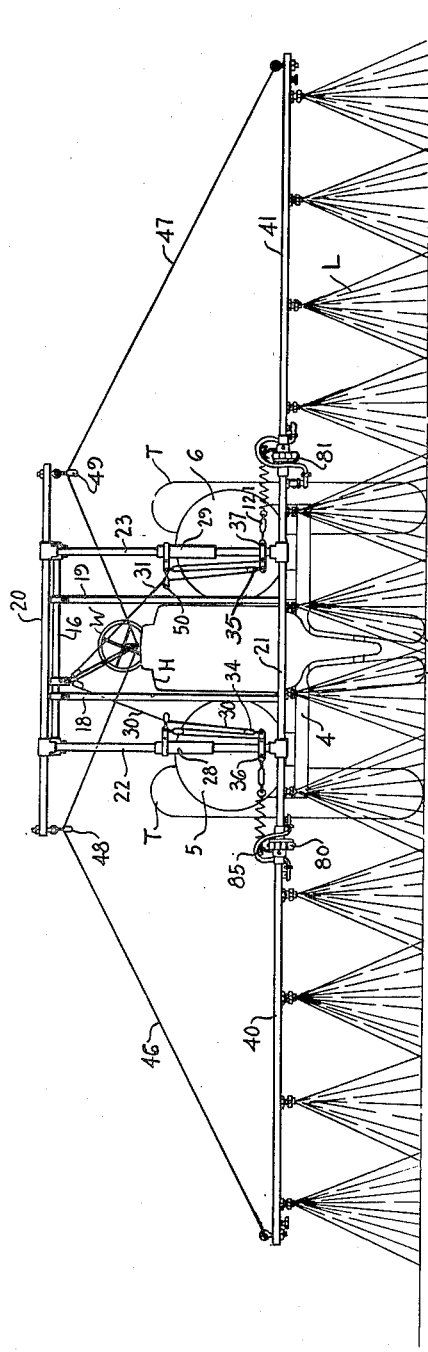

Referring to the drawings by the use of reference numerals, a farm tractor is conventionally illustrated as having traction wheels T, front dirigible wheels S, the usual engine hood H, steering wheel W, and driver's seat D (see Figs. 1, 2, 3 and 19).

Suitably fixed to the tractor frame we have shown longitudinal angle members 1 and 2 and transverse outwardly projecting members 3 and 4 at either side of the tractor and serving to support barrel or drum shaped tanks 5 and 6.

The longitudinal members 1 and 2 are shown as extending forwardly from the front of the tractor and as carrying an upight frame support comprising a pair of vertical tubular members 10 and 11 connected at their lower ends by T's to a cross tube 12, and to a similar cross pipe or tubular member 16 at their upper ends. Bracket supports such as shown at 13 and 14 on the extensions of the angle members 1 and 2 embrace the cross tube 12. Upwardly and forwardly extending bracing members 18 and 19 are fixed to the angle members 1 and 2, and to the cross member 16.

The frame structure thus far described provides a rigid carrier having two spaced apart vertical tubular members which may serve as guides on which the sprayer frame is adjustably mounted. The sprayer frame is preferably formed of a rectangle of tubes, the lower one of which carries spray nozzles and the hinges for the extensions, as will now be described.

Figure 3:
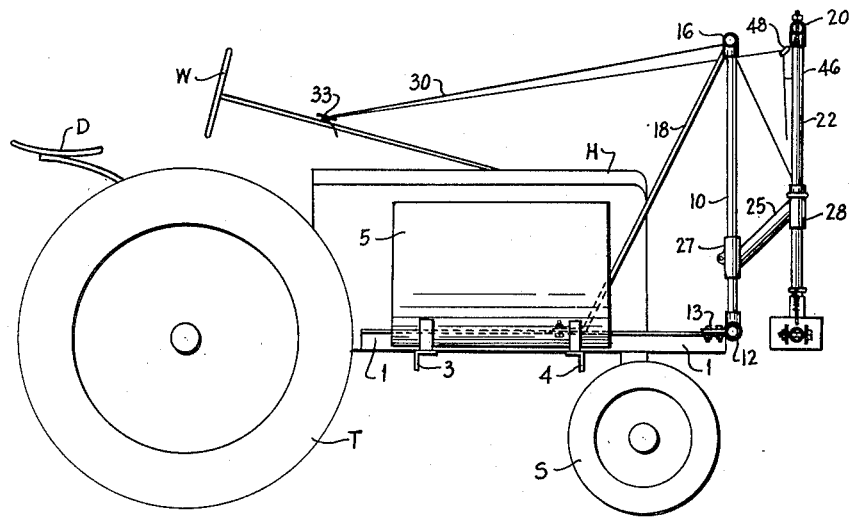
Fig. 3 is a side elevation of the device shown mounted on the tractor.
Figure 4:
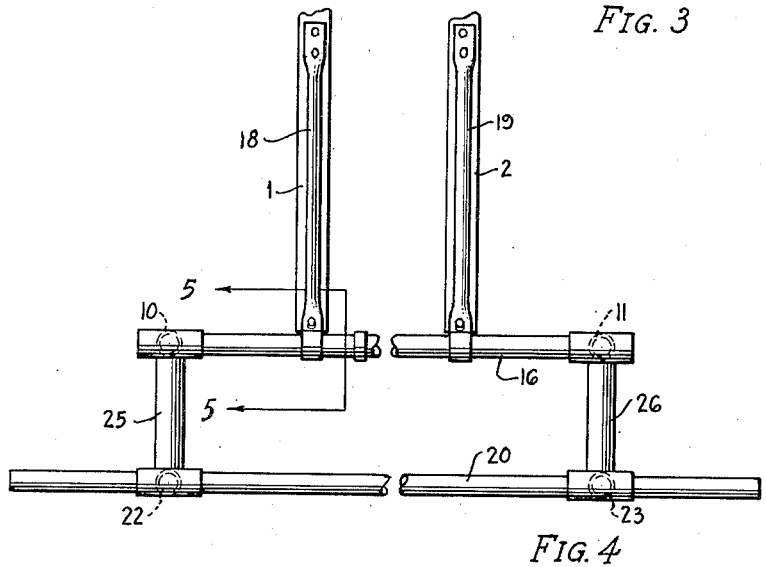
Fig. 4 is a fragmentary plan of the carrier frame connected to the tractor.
Figure 5:
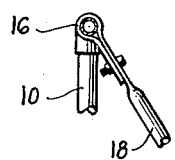
Fig. 5 is a detail showing the connection of one of the braces with the frame, as indicated by the lines 5—5 of Fig. 4.

The horizontal upper and lower members of the sprayer carrying frame proper are designated 20 and 21. These are connected by uprights 22 and 23 paralleling the uprights 10 and 11, and to which they are connected by forwardly and upwardly extending tubular members 25 and 26 (Figs. 3 and 4), and which are each connected with sleeves at each end embracing the vertical tubes as indicated at 27 and 28, respectively (Fig. 3).

The embracing members 27 are adjustable to be slidable on their vertical members while the corresponding forward members as at 28 may be rigidly clamped or fixed on their respective tubes, 22 and 23.

Thus, the rectangular frame comprising the horizontal and vertical tubular elements in front of the corresponding frame fixed to the tractor may be moved up and down while its component parts are held in its desired relative position. Any suitable means for so moving the sprayer carrying frame may be provided. For example, we have shown cables 30 and 31 connected with the frame by suitable pulleys 34 and 35. These cables may lead to a position ahead of the steering wheel W, at which point they may be attached to a clamp or anchor 33.

The spray boom preferably comprises sections extending from the ends of the lower horizontal tubular section 21 of the movable frame and normally in alignment therewith and hinged thereto, as will hereinafter appear.

Figure 2:
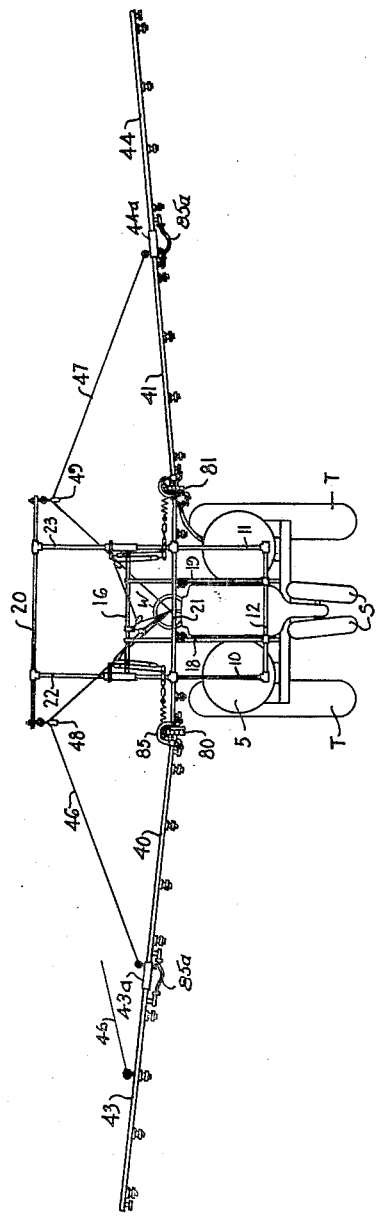
Fig. 2 is a similar view showing the arrangement of the spray nozzle carrying members with additional extensions at either side of the tractor and in an elevated position.

Attached to the outer ends of the boom members 40 and 41 are guy wires or cables 46 and 47, shown as passing through pulleys 48 and 49 and leading to an anchoring point, which may be the member 33, to which the lifting cables are also attached or may be a separate member, if desired. By adjusting these guy wires 46 and 47, the boom members 40 and 41 may be raised or lowered at an angle with the central member 21, as shown in Fig. 2.

It is desirable that the extensions of the boom carrying the tubular elements leading to evenly spaced nozzles shall be light yet rigid, and that the nozzles may be conveniently and rigidly mounted while the passages leading thereto are of non-corrosive material and of a size to be economical in first cost and efficient in use.

To this end the members 21 and boom extensions 40 and 41 are constructed of light but rigid thin wall tubes within which are carried smaller tubes 45 of brass, copper, or other non-corrosive material.

Referring particularly to Figs. 11 to 18, the method of attaching the nozzles to the tube sections 45 and of forming connections for passages leading thereto, will now be described.

Secured to the tubes 45, as by soldering or brazing, are threaded nipples 50, each having an outwardly projecting flange 51 and an internal passage 52.

After securing the nipples to the tubes 45, the communicating passage 54 is drilled through the wall of the inner end of the nipple 50 into the tube 45.

The spacing of the nipples corresponds to the spacing of openings 60 formed at predetermined distances along the tubes 21, 40 and 41.

The tube, with the nipples attached, is then thrust longitudinally into the outer tube. For example, the tube 21 (see Fig. 12) and the nipples are brought opposite the openings 50 and are then moved to project the nipples through these openings to the position shown in Fig. 13.

A serrated or locking washer 62 having been placed over each nipple, a nut 63 may be threaded onto the nipple 50 and tightened against the pipe or tube 21, distorting the metal engaged between the washer 62 and the flange 51, and the nut 63, forming a flat portion affording rigidity to the mounting of the nipples and the liquid carrying tube 45.

The spray nozzle parts may include washers 64 and 65 embracing a flange 66 of a screen 67 adapted to project into an opening in the nipple, a nozzle head member 70 having a flange engaged by the flange 72 of a flanged nut 74 which when threaded into position clamps the nozzle head and screen in the position shown in Figs. 14 and 15.

An opening 75 in the nozzle head communicates with the passage 52 and inner side of the screen, and its outlet opening may be so shaped as to produce a fan-like spray of liquid, as indicated at L, Fig. 1.

The tubes 45 in each instance terminate short of the ends of their carrying pipes, and at the ends adjacent the hinge mountings, designated generally at 80 and 81, each tube 45 is provided a fitting closing the ends and connected with a hose member 85 which is preferably looped up over the hinges or other connection between the boom extensions and the frame member 21 of the boom. Adjacent ends of the tube sections 45 may be similarly connected by hose members 85a, at the sleeve joints 43a and 44a, as shown in Fig. 2.

As shown, at the ends of the liquid carrying tube sections 45 is fitted an L 82 with its threaded portion extended through the carrying tube member 21, and to which may be fitted another L 83 connected with a suitable coupling 84 with the hose section 85.

At the point of feeding into the liquid carrier tubes 45, one of the L's 82 is connected with a T 86 provided with a fitting 87 for connection with the hose 85 and with a fitting 88 for connection with the main feed hose 90, leading from the source of supply, namely, either of the drums 5.

Figure 9:
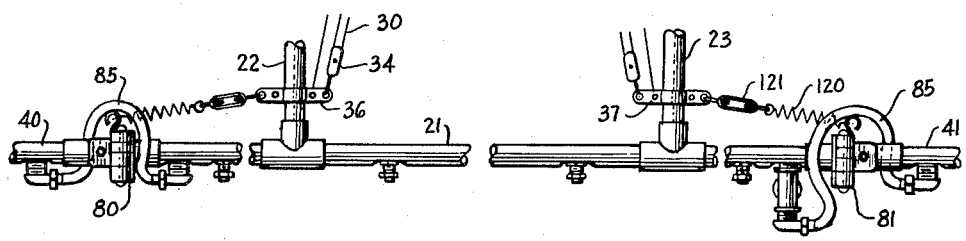
Fig. 9 is a fragmentary front elevation showing the hinges for the extensions, and the tubular connections and spring holding means.
Figure 10:
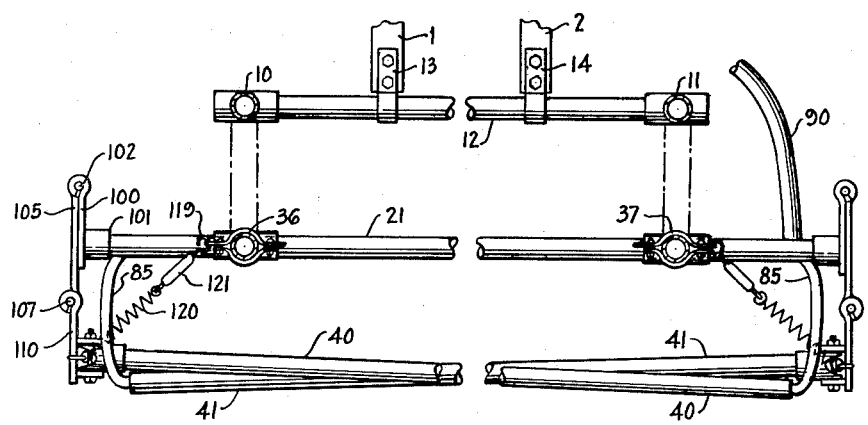
Fig. 10 is a plan through the lower portion of the spraying carrier frame and showing the extensions folded inwardly.

Referring particularly to Figs. 8 and 9, it will be noted that the central section of the spray boom is connected at each end with the outer boom sections by a hinge support around and over which the hose 85 is looped, and which has sufficient length or play to permit the outwardly extending arms 40 and 41 of the boom to be swung about the hinge to the positions shown in Fig. 10.

The hinge construction supporting the tubes 40 and 41, and thus carrying the spray conveyor tubes, preferably comprises wide double acting hinge supports, each having a plate portion 100 secured by a collar 101 to the ends of the tube 21 and extending rearwardly, as shown, and shaped to embrace a hinge pintle 102 which is also embraced by a bearing portion at one end of a hinge plate 105. This intermediate plate extends an equal distance to the opposite side of the support 101 and embraces a pintle 107, which also provides a bearing for the third hinge member 110, which is shown as having a connection with the outwardly extending section 40 (or 41) and which aligns with the support 101, and thus brings the tubular members of the boom into alignment when the hinge is in the closed or folded position shown in Fig. 8.

Figure 20:
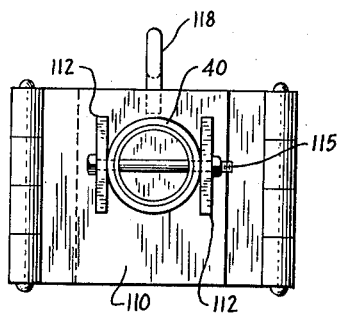
Fig. 20 is a view of one of the hinges showing the carrying support.
Figure 21:
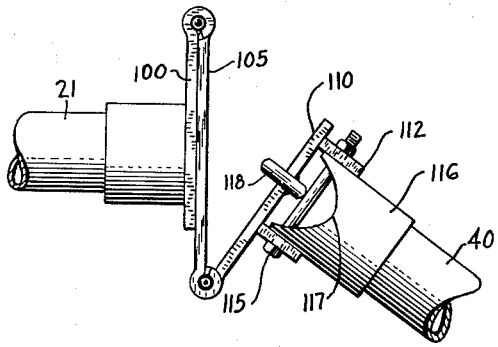
Fig. 21 is a top plan of the same showing the hinge partly open.

The hinge construction is shown on enlarged scale in Figs. 20 and 21, and here it will be seen that the connection with the tube 40 (or 41) may comprise a pair of ears 112 carrying a pivot in the form of a bolt or screw 115 extending through the ends of a collar 116 secured to the end of the tube 40 and preferably so notched or cut, as indicated at 117, as to permit unrestricted upward and downward swinging movement through a considerable arc with relation to the plate 110.

As stated, the length of the three hinge parts and particularly that of the plate 105, which extends equal distances from the aligned supporting tubes of the boom, is such as to provide a wide face contact when the parts are in the position shown in Figs. 8 and 20.

The vertical distance is also such as to afford a substantial area of support such that a definite rigidity is given to the normal outwardly extending position in alignment transversely of the path of travel.

Any suitable means may hold the hinge in its closed position, but we prefer to use a spring, such as indicated at 120, connected to a hook 118 secured to the outer plate 110 and connected to the frame, as indicated at 119 (Fig. 10).

The length and strength of the spring is such as to normally and firmly draw the hinge to its closed position, and an adjustment such as a turn buckle 121 may be provided for suitably tightening the same.

It will be noted that this spring permits the hinge, however, to open between the inner and intermediate plates 100 and 105 in case the outer end of the boom tube 40 or 41 carried thereby is swung rearwardly. Likewise, it will permit the outer plate 110 to swing with relation to the plate 105, as indicated in Fig. 21, and will further stretch, or extend, to permit these outer carrier plates 110 to swing to the positions shown in Fig. 10 where the arms or boom extensions are in a "folded" position, indicated in Fig. 10.

Figure 19:
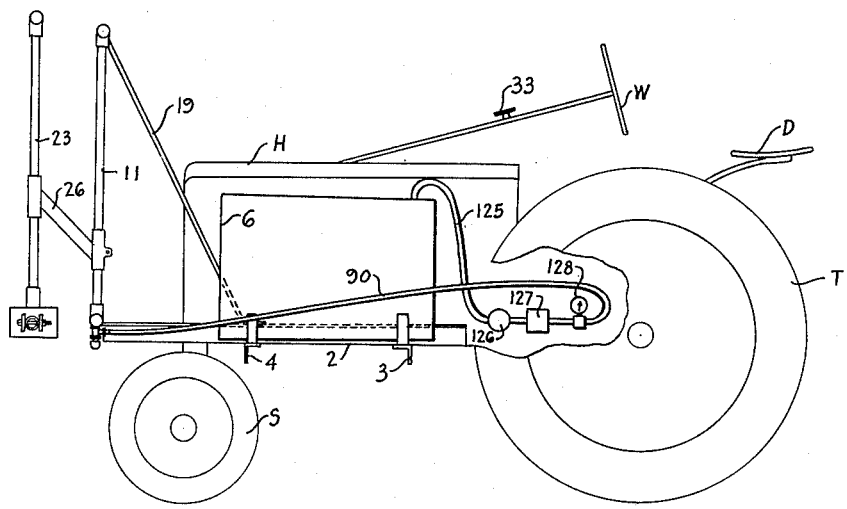
Fig. 19 is a diagrammatic view showing the arrangement on the tractor and illustrating the position of pump, pressure control gauge, etc., and connections with a reservoir for the spraying liquid.

The hose or pipe line 90, as will be seen in Fig. 19, may connect with the supply tank 6 through passages 125 and through a filter 126, pump 127, and gauge 128. The feeder line 125 connected with the supply tank 126 obviously may be connected with the other supply tank 5.

The pump 126 may be connected by means, not shown, with the power mechanism of the tractor, and in practice it is so arranged as to control the pressure of the fluid being forced to the spray nozzles.

From the foregoing description, it will be seen that we have provided a structure by which a three section boom, or a boom of five or more sections, may be carried on a vehicle such as a farm tractor, and may afford various advantages of adjustability and effectiveness in use accompanying the aforesaid objects and other advantages.

The carrying structure is light and rigid. The outer sections of the boom may be supported by guy wires and raised or lowered from the driver's seat. The evenly spaced nozzles may be supplied with uniform pressure through small non-corrosive tubular passages. In operation the spray may be forced from the nozzles at reasonable pressures, say, twenty to forty pounds. The nozzles are accessible for convenient cleaning. Because of the small diameter of the feeder pipes leading to the nozzles, the weight of spray fluid in them is held to a minimum. Likewise, loss of spray fluid by dripping after shutting off the supply to the nozzles is small.

A convenient boom length for many uses is attained by making the center section 21 and extension sections 40 and 41 of about six foot lengths. Incidentally, these boom units are convenient for shipping and handling.

Experience has shown that with a speed of four miles per hour, we may effectively spray an acre with five gallons of spray liquid, with an eighteen foot boom.

The fan-shaped or cone-shaped sprays meet to completely cover the distance below the boom when the nozzles are from one to two feet above the plant growth or "weed height." The device may be used over very rough and uneven ground, and by raising or lowering either or both extensions of the boom, the contour of the ground may be closely followed for most effective height of spray. The assembly readily lends itself to changes of the spray pattern.

The nozzles are easily replaceable for different pressures and for changing the tips to meet different conditions.

Our device has been found especially useful with 2,4-D "Weed No More" weed killers, although, obviously, various other liquid sprays, insecticides, etc., may be sprayed with this machine.

The vertical slidable carrier for the boom proper riding on the fixed verticals 10, taken with the swinging function of the hinges carrying the boom extensions provides great flexibility and adaptability in use.

The folding of the extensions in front of the vehicle brings them approximately within its normal width of wheel spacing, permitting it to be moved about in narrow lanes through ordinary farm gates, through barn and shed doors, along highways, etc. The freedom to swing rearwardly avoids collision damage to the outboard boom sections when striking fixed obstacles such as fences, trees, rocks, etc.

Having thus described our invention, what we claim in:

1. The combination with a self-propelled vehicle of a transverse boom comprising middle and outboard aligned hollow unit sections, a series of spray nozzles carried by each section, a tube within each section connecting the nozzles carried thereby, a frame supported by the vehicle connected with and supporting the middle boom section, and hinges fixed to the hollow unit sections between said middle and outboard sections and having both vertical and horizontal pivots, the outboard sections being swingable inwardly about the vertical pivots to coextensive position.

2. A spraying device including a support adapted to be attached to a vehicle, nozzle carrying boom members projecting outwardly laterally from the vehicle, and hinge connections between each boom member and the support, said hinge connections each comprising a plate fixed on the support and a plate attached to the boom and an intermediate plate vertically pivoted at its opposite ends to the other hinge plates.

3. The structure described in claim 2, in which the outer hinge plate is provided with a horizontal pivot connected to the adjacent outwardly projecting boom section.

4. A spraying device including a support adapted to be attached to a vehicle, nozzle carrying boom members projecting outwardly each way from the vehicle, and hinge connections between each boom member and the support, said hinge connections comprising a plate fixed on the support and a plate attached to the boom and an intermediate plate pivoted at its opposite ends to each of the other hinge plates, and a tension spring connecting the boom plate and the support, said spring exerting tension toward the support and normally longitudinally of the boom.

5. In a spraying device of the character described, the combination of a plurality of boom members normally held in alignment and in horizontal operative position, a frame for attaching the boom members to a tractor including a pair of vertical tubes, a second pair of vertical tubes, connecting and supporting arms each having sleeves embracing a tube at each end of the arm, the inner end of the arm having means for clamping it in various vertical positions on the embraced tube, the sleeve at the outer end of each arm slidably embracing the outer vertical tube, flexible means for sliding the outer tubes to raise and lower the boom, hinged connections between each outer tube and a boom section, spray nozzles carried by the boom sections and means for leading spray fluid thereto.

6. A spraying device adapted for attachment to a vehicle, comprising a plurality of longitudinally aligned outwardly extending boom sections and a support therefor fixed to the vehicle, hinge members connected with the support for each of the outwardly extending boom sections, each hinge member having a pair of vertical pivots positioned laterally from the boom section, and having a horizontal pivot directly supporting one of the boom sections whereby the boom may swing rearwardly about one vertical pivot and outwardly and forwardly around the other vertical pivot in a substantially horizontal plane to permit relative folding in adjacent substantially parallel positions, spring means acting normally to resist swinging about the vertical hinges, each of the boom sections having tubular liquid-carrying members and spaced apart nozzles communicating therewith, and flexible tubular connections adjacent the hinges permitting said swinging movement.

7. In a weed spraying device, a rigidly mounted and horizontally disposed center section, a lateral section disposed at an end of said center section, and hinge means connecting said sections together, said means including an intermediate plate, an inner plate and an outer plate hinged at opposite sides and opposite ends to said intermediate plate, said inner plate being secured to said center section, spaced brackets secured to said outer plate, and a horizontal hinge pin extending through brackets and through said lateral section, whereby said lateral section may be swung in a vertical plane.

8. The device as defined in claim 7 together with resilient means for urging said plates together.

References Cited in the file of this patent

UNITED STATES PATENTS

| Number | Name | Date |
|---|---|---|
| 926,791 | Watson | July 6, 1909 |
| 947,297 | Davidson | Jan. 25, 1910 |
| 978,082 | Wallace | Dec. 6, 1910 |
| 999,676 | Schoelles | Aug. 1, 1911 |
| 1,118,091 | Willis et al. | Nov. 24, 1914 |
| 1,583,619 | Splittstoser | May 4, 1926 |
| 1,634,701 | Williams | July 5, 1927 |
| 1,883,479 | Bateman et al. | Oct. 18, 1932 |
| 1,887,092 | Glase | Nov. 8, 1932 |
| 1,987,962 | Leupold | Jan. 15, 1935 |
| 2,169,948 | Gallupe | Aug. 15, 1939 |
| 2,210,346 | Stayton | Aug. 6, 1940 |
| 2,221,433 | Pitner | Nov. 12, 1940 |
| 2,252,206 | Rice | Aug. 12, 1941 |
| 2,266,223 | Lund | Dec. 16, 1941 |
| 2,273,344 | Black et al. | Feb. 17, 1942 |
| 2,305,913 | Troyer | Dec. 22, 1942 |
| 2,359,300 | Cartwright | Oct. 3, 1944 |
| 2,548,209 | Foster | Apr. 10, 1951 |